United States Patent [19]

Hsiung et al.

[11] 3,876,546

[45] Apr. 8, 1975

[54] FOUR-MEDIA FILTER

[75] Inventors: Andrew K. Hsiung; Walter R. Conley, both of Corvallis, Oreg.

[73] Assignee: Neptune Microfloc, Incorporated, Corvallis, Oreg.

[22] Filed: Dec. 3, 1973

[21] Appl. No.: 421,451

[52] U.S. Cl. ................................. 210/275; 210/290
[51] Int. Cl. ...................... B01d 23/16; B01d 23/24
[58] Field of Search ......... 210/263, 290, 35, 80, 82, 210/275

[56] References Cited
UNITED STATES PATENTS

| | | | |
|---|---|---|---|
| 293,745 | 2/1884 | Hyatt | 210/290 |
| 3,343,680 | 9/1967 | Rice et al. | 210/263 |
| 3,382,983 | 5/1968 | Stewart | 210/290 X |
| 3,557,961 | 1/1971 | Stuart, Sr. | 210/290 X |
| 3,704,786 | 12/1972 | Lerner et al. | 210/290 |
| 3,757,954 | 9/1973 | Toth | 210/290 X |

*Primary Examiner*—Charles N. Hart
*Assistant Examiner*—Robert H. Spitzer
*Attorney, Agent, or Firm*—Klarquist, Sparkman, Campbell, Leigh, Hall & Whinston

[57] ABSTRACT

A filter bed comprises four filter media of different specific gravities and sizes. The media are intermixed in such a manner that the number of particles continually increases in the direction of fluid flow through the bed. The media comprise coal of two different size ranges and specific gravities, plus silica sand and garnet.

3 Claims, 8 Drawing Figures

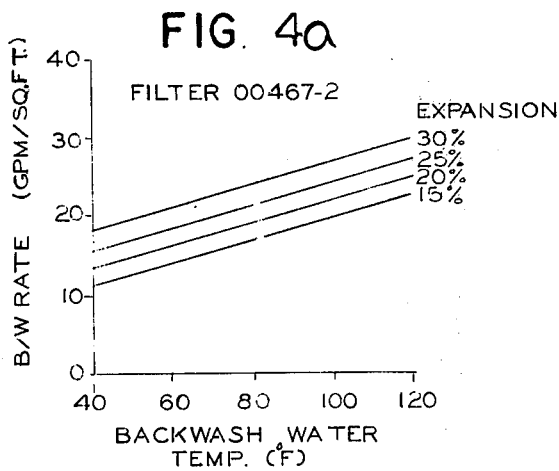
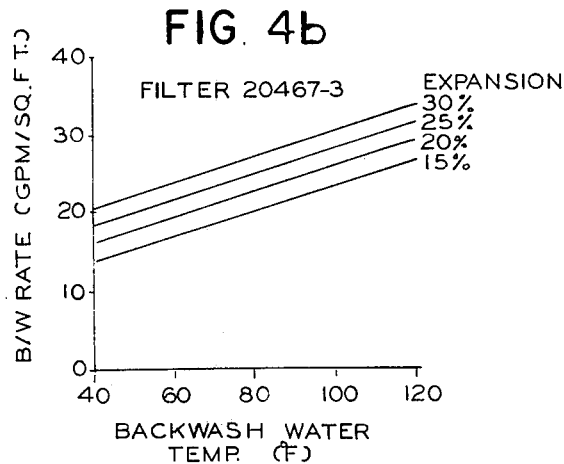
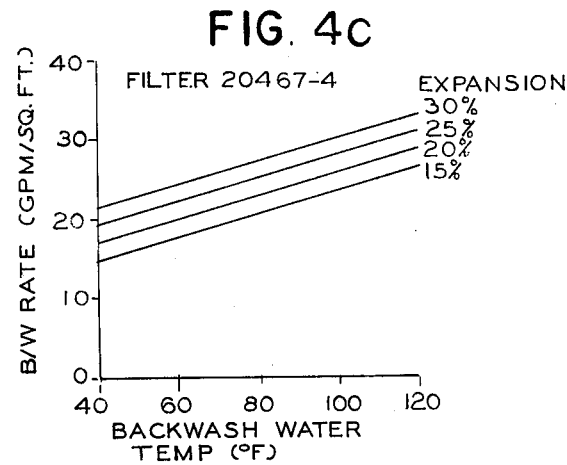
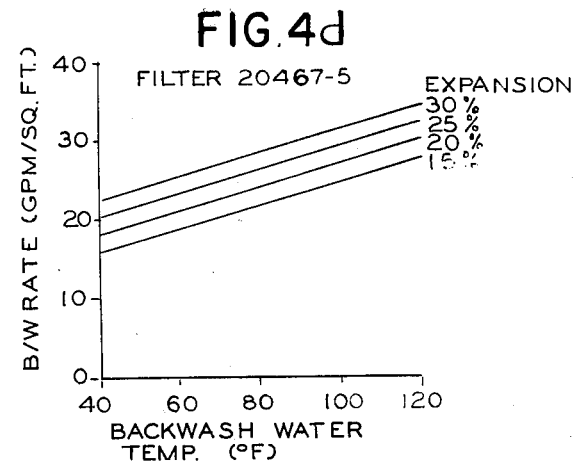
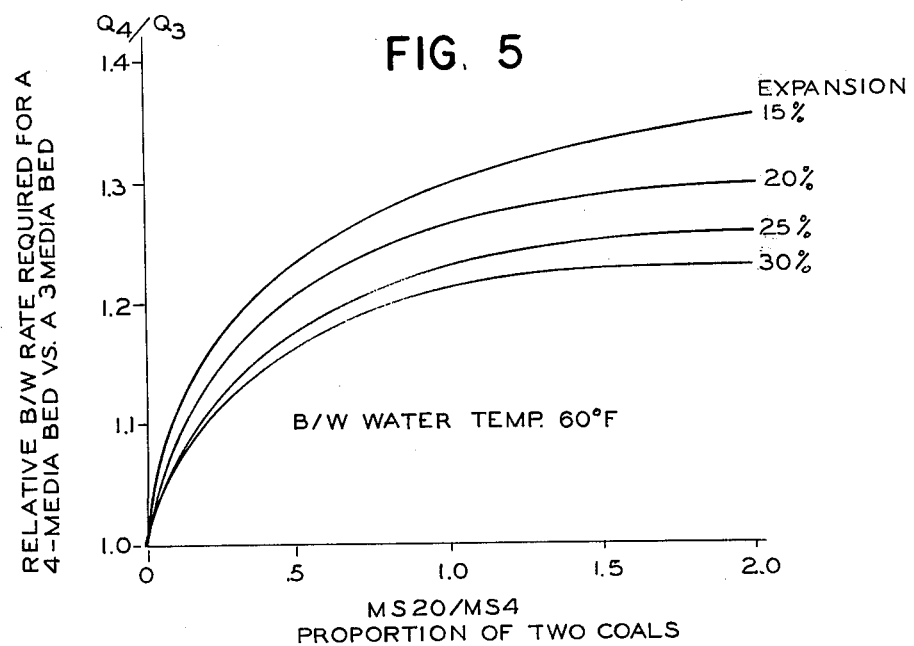

FOUR-MEDIA FILTER

BACKGROUND OF THE INVENTION

This invention relates to filters for the filtration of water and, more particularly, to such filters comprising intermixed filter media of different specific gravities and sizes.

The rapid sand filter is well known for its use in the filtration of water. Such filters, however, are nominally rated at about only 2 gpm per square foot. Higher filter rates are prevented by rapid headloss buildup and a tendency of the filter to bind. The rapid sand filter also presents a hydraulic grading problem during backwashing, which generally results in placement of the finest grains at the top of the bed. This in turn causes the filter to remove most of the solids in the top few inches of the sand thus causing the resulting high headloss.

A layer of coal has been used over the sand to help overcome the headloss problems above noted. The coarse particles of coal remove the large solids, leaving the finer particles to be removed in the sand. Such a filter provides marked improvement in headloss characteristics over the rapid sand filter, but results in a reduced overall media surface area in the filter bed and lowers the stability and efficiency of the filter. It is not possible to use a finer grade of sand to restore stability and efficiency, because the sand tends to regrade above the coal upon backwash, eliminating the headloss advantage provided by the coal. The coal and sand filter is susceptible to breakthrough upon exposure to rapid changes in flow, i.e., surges, and also experiences difficulty in producing a satisfactory effluent and long filter runs when the applied solids in a loading rise.

A mixed media filter was disclosed in Rice and Conley U.S. Pat. No. 3,343,680 of Sept. 26, 1967, which filter has overcome to a large extent the problems of the coal and sand filter and has extended the advantage of better headloss characteristics over the rapid sand bed. The Rice et al filter utilizes three different filter media, the particles of which are of different specific gravities and sizes. The particles comprise, for example, relatively large particles of a material of relatively low specific gravity, relatively small particles of a material of relatively high specific gravity, and particles of an intermediate size and an intermediate specific gravity.

The Rice et al filter bed after backwashing has at its very top a relatively large number of the large particles, a smaller number of the intermediate particles and a still smaller number of the finer particles. At an intermediate portion of the bed, the intermediate particles predominate in number and the larger and smaller particles are fewer in number, although the number of smaller particles is greater than at the top. At the bottom of the filter the smaller particles predominate in number and there are fewer of the intermediate particles and still fewer of the larger particles. The filter attempts to achieve the ideal theoretical state wherein the size of the media grains decreases uniformly in the direction of flow. Such an ideal configuration captures increasingly smaller solid particles as they pass from the top of the filter to the bottom, distributing them throughout the entire depth of the filter bed. Slow headloss buildup results and the filter has the ability to accept higher solids loadings with longer filter runs. The mixed media filter achieves a consistently higher filtered water quality than either the rapid sand or the coal and sand filter.

Another three-media filter utilizing anthracite coal was disclosed by W. Leslie Harris of the Contra Costa County (Calif.) Water District, in the Aug., 1970, Journal of the American Water Works Association, pages 515–519. The specific gravity of commercial anthracite varies, and the Harris publication described use of a layer of sand under a layer of coal, which latter layer combined size No. 2 anthracite, specific gravity 1.4, with size No. 1½ anthracite, specific gravity 1.6, in a 2:1 ratio. The Harris publication claimed that the filter achieved low headloss and acceptable clarity at 10 gpm/sq.ft. operation over workable filter runs.

A detailed design of a Contra Costa County filter was also disclosed by Brian G. Stone at the 51st Annual Conference of the AWWA, California section, San Francisco, Oct. 1, 1970. This filter had Lower layer — 10 inches silica sand, specific gravity 2.6, effective size 0.3 mm.

Intermediate layer — 8 inches anthracite specific gravity 1.58, effective size 0.89 mm.

Top layer — 16 inches anthracite, specific gravity 1.48, effective size 1.58 mm.

Combined depth after backwash — 31 inches.

Our tests of a filter made according to the Contra Costa County design, however, have indicated higher than desirable headlosses. Additionally, it has been observed that after backwashing, a significant amount of the sand becomes mixed with the coal at the top of the filter instead of staying at the bottom. Such misplaced fine media results in the increase in headloss and, consequently, a short filter run.

As stated hereinabove, in an ideal filter the size of media grain should decrease uniformly in the direction of flow through the bed. Accordingly, it is the primary object of the present invention to provide a mixed media filter wherein the particle distribution from top to bottom will more closely approximate the ideal than has been heretofore possible.

It is a further primary object of the present invention to provide an improved filter that is more effective than prior filters for the tougher filtration jobs, such as handling municipal secondary effluent, industrial waste or unsettled water.

It is a further object of the present invention to provide such a filter wherein the different media will return to their desired positions after backwashing.

It is a still further object of the present invention to provide such a filter that will further increase the particle size at the upper layer of the filter bed after backwashing beyond that heretofore possible.

SUMMARY OF THE INVENTION

We have discovered that unexpectedly an improved filter is provided when it comprises a substantially continuously increasing number of particles of filter media per unit area in the direction of water flow through the bed, yet includes particles of at least four different specific gravities. The larger size particles of each medium are of lower specific gravity and there are at least five percent by weight of each filter medium. More specifically, the filter media comprise coal of two different size ranges and specific gravities, plus silica sand and garnet.

DESCRIPTION OF THE DRAWINGS

FIG. 4a is a graph of required backwash rate as a function of backwash water temperature for different percentage expansions of a three-media filter bed.

FIGS 4b through 4d are similar graphs for three different four-media filter beds.

FIG. 5 is a graph of the relative backwash rates between four- and three-media filter beds as a function of the proportion by volume of the two different specific gravity coals in the four-media bed design.

DESCRIPTION OF THE PREFERRED EMBODIMENT

Figure 1:
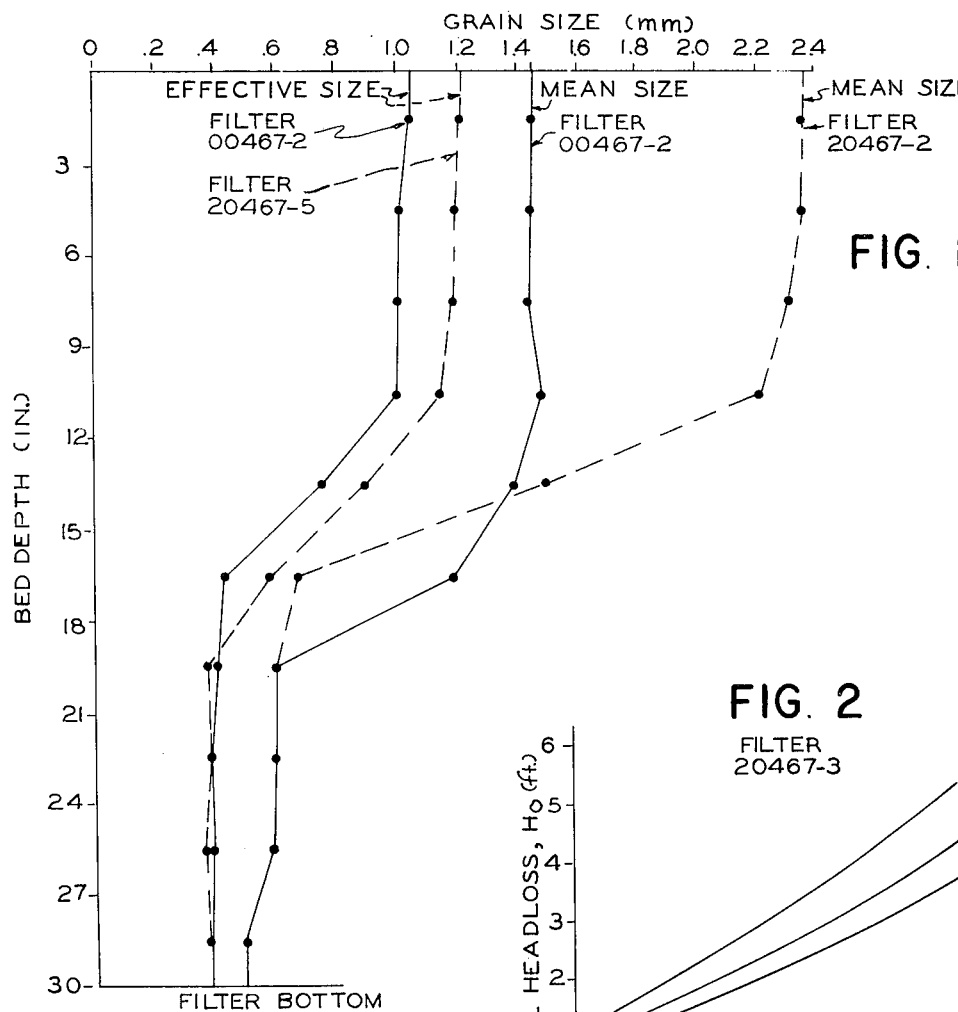
FIG. 1 is a graph of a core sample analysis of a four-media filter bed compared with a similar analysis of a three-media bed.

As does the filter disclosed in the aforementioned U.S. Pat. No. 3,343,680, the filter of the present invention utilizes a plurality of different filter media the particles of which are of different specific gravities and sizes. The different media are intermixed, but the intermixing is not uniform, but rather such that the bed has a substantially and continuously increasing number of particles per unit area in the direction of water flow therethrough. The media comprise relatively large particles of material having a relatively low specific gravity, relatively small particles of a material having a relatively high specific gravity and particles of intermediate size and correspondingly intermediate specific gravity.

When the different filter media which are to form the bed are backwashed, an orientation is achieved wherein there are a relatively large number of the large particles at the top, with relatively few of the intermediate size particles and fine particles. At an intermediate position in the bed the intermediate sized particles predominate in number, with the larger and smaller particles being fewer in number. At the bottom of the bed the smaller particles predominate in number and there are fewer of the intermediate sized particles and still fewer of the larger particles. Four different types of particles are used, each being of a different specific gravity and effective size. As has been previously mentioned, a minimum of five percent of each filter medium by weight is required.

Two of the media utilized in the filter comprise coal of different specific gravities and sizes. The specific gravity of anthracite may vary from 1.40 to as high as 1.80. Thus, one filter medium may comprise anthracite having a specific gravity in the range between about 1.40 and 1.50, and an effective size between about 1.45 and 1.90 mm. with a uniformity coefficient of 1.8 or less. The range of sieve size of this coal is between No. 3 and No. 14. The second filter medium may comprise anthracite having a specific gravity in the range between about 1.60 and 1.80, and an effective size between about 1.0 and 1.1 mm. with a uniformity coefficient of 1.8 or less. The range of sieve size of this coal is between No. 8 and No. 18. ("Effective" size is that particle size such that 10 percent of the particles are finer. "Mean" size is that particle size such that 50 percent of the particles are finer. "Uniformity coefficient" is the ratio of the 60 percent size to the 10 percent size.)

Alternatively, cannel coal may be used for the first (lower specific gravity) medium. Such has a specific gravity in the range between about 1.30 and 1.40 and an effective size between about 1.8 and 2.2 mm.

The third filter medium comprises silica sand, which is the sand widely used for water filtration. Such has a specific gravity in the range between about 2.60 and 2.65, an effective size in the range between about 0.45 and 0.55 mm. and a uniformity coefficient of about 1.3. The fourth filter medium comprises garnet having an effective size in the range between about 0.25 and 0.35 mm. and a uniformity coefficient of about 1.8. Alternatively, the fourth filter medium may comprise ilmenite having a specific gravity in the range between about 4.3 and 4.7.

Use of the four different specific gravity materials achieves a surprising and unexpected improvement in filter performance. Significant inprovements in headloss characteristics and filter run length have been achieved. Tests of a filter using the two different specific gravity anthracites has resulted in a change in the grain size at the top of the filter from a mean of about 1.4 mm. in the typical three-media filter bed to a mean of about 2.4 mm. in the four-media bed without requiring a change in the grain size of any of the other components. The increased grain size at the top of the filter increases the solids holding capacity. Increases varying from 15 to 100 percent, depending on the nature of the material being filtered, have been achieved.

Use of the extended filter media gradation increases the storage capacity of the filter. The filter accepts higher influent solids loadings and/or provides longer filter runs. Typically, filter runs are 25 to 50 percent longer at the same solids loading as compared with the three-media filter, or filter runs are of the same length at a 25 to 50 percent higher solids loading. Flow rates between 5 and 10 gpm/sq.ft. are obtainable for municipal applications and 5 to 20 gpm/sq.ft. for industrial applications.

The four-media filter requires a backwash rate 16 to 36 percent higher than does the three-media filter. This backwash rate is required adequately to fluidize the bed, but once fluidized, the bed cleans faster due to the increased flow. Whereas a typical backwash cycle is 6 to 8 minutes for a three-media filter, only 5 to 6 minutes is required for a four-media filter. Thus, the total backwash water required is the same, generally 100 gal./sq.ft. of filter area.

Applications of the four-media filter are particularly beneficial in the direct filtration of unsettled waters, industrial wastes, and in tertiary filtration. Uses in municipal water treatment are for raw waters that experience periodic surges of high solids loadings or where there are high concentrations of filter clogging algal growths.

Comparison Tests

Ten three- and four-media filter beds were constructed for comparison test purposes. Each filter was given a numerical designation according to the following code:

00467 for three-media filters consisting of
  MS-4 — anthracite coal, specific gravity 1.60 to 1.64
  MS-6 — silica sand MS-7 — garnet
20467 for four-media filters consisting of
MS-20— anthracite coal, specific gravity 1.45 to 1.50
MS-4 — anthracite coal, specific gravity 1.60 to 1.64
MS-6 — silica sand
MS-7 — garnet
20460 for three-media filters consisting of
MS-20— anthracite coal, specific gravity 1.45 to 1.50
MS-4 — anthracite coal, specific gravity 1.60 to 1.64
MS-6 — silica sand The filters were constructed as shown in Table I. Relative volumes of the lower and higher specific gravity anthracites varied from 0.5 to 2.0, although the ratio of such volumes can range from 0.1 to 10.0.

TABLE I

| | Depth of Media (inches) | | | | |
|---|---|---|---|---|---|
| | MS-20 | MS-4 | MS-6 | MS-7 | Total |
| 00467-1 | 0 | 16.5 | 9 | 4.5 | 30 |
| -2 | 0 | 18 | 9 | 3 | 30 |
| -3 | 0 | 24 | 9 | 3 | 36 |
| 20467-1 | 16 | 8 | 9 | 3 | 36 |
| -2 | 16 | 12 | 6 | 2 | 36 |
| -3 | 6 | 12 | 9 | 3 | 30 |
| -4 | 9 | 9 | 9 | 3 | 30 |
| -5 | 12 | 6 | 9 | 3 | 30 |
| 20460-1 | 18 | 9 | 9 | 0 | 36 |
| -2 | 12 | 12 | 12 | 0 | 36 |

A filter column two inches in diameter was constructed in sections with self-releasing tapered joints. Each section was three inches in depth. After backwashing to 20 percent expansion for about 30 minutes, the column was drained dry and disconnected. The media retained in each section represented a core sample at each layer of the filter bed.

A comparison of a core sample analyses from a three-media bed, 00467-2, with a four-media bed, 20467-5, is shown in FIG. 1. Changing from a three-media filter having 18 inches of higher specific gravity anthracite to a four-media filter having 6 inches of the high specific gravity anthracite and 12 inches of the low specific gravity anthracite, without changing the other two filter media, changed the size of the grain at the top of the filter from a mean of about 1.4 mm. to about 2.4 mm.

Filters 00467-2, 00467-3 and 20467-1 were used to compare three- and four-media filters for turbidity and color removal characteristics. Table I shows that the depth of sand and garnet in each of the three filters was the same. The only difference was in the anthracite coal, filter 00467-2 having 18 inches of the high specific gravity anthracite; filter 00467-3 having 24 inches of the high specific gravity anthracite; and filter 20467-1 having 8 inches of the high specific gravity anthracite and 16 inches of low specific gravity anthracite.

A typical filter run for turbidity removal is shown in Table II. A Kaolin suspension of 100 mg/l was used as the filter influent to achieve an influent turbidity of about 100 JTU. Filtration rate was 5 gpm/sq.ft. Eight mg/l of alum and 0.005 mg/l of "Magnifloc" 985-N, a filter conditioning polymer manufactured by American Cyanamid Co., Wayne, N.J., were fed ahead of the filters. The test results indicated that filter 20467-1 having the two kinds of coal performed significantly better than both the three-media filter beds having only the higher specific gravity anthracite. Filter 00467-3, which had six inches more of the high specific gravity anthracite, ran slightly longer before breakthrough, but not nearly as long as filter 20467-1. The four-media filter also had significantly less headloss throughout the run.

TABLE II

| Time (hr.) | Headloss (feet) | | | Effluent Turbidity (JTU) | | |
|---|---|---|---|---|---|---|
| | 20467-1 | 00467-2 | 00467-3 | 20467-1 | 00467-2 | 00467-3 |
| 0 | 1.34 | 1.98 | 2.40 | — | — | — |
| 0.5 | 1.56 | 2.34 | 2.68 | 0.115 | 0.120 | 0.118 |
| 1.0 | 1.70 | 2.54 | 2.83 | 0.130 | 0.240 | 0.145 |
| 1.5 | 1.84 | 2.83 | 3.11 | 0.200 | 0.220 | 0.210 |
| 2.0 | 1.91 | 2.97 | 3.25 | 0.125 | 0.155 | 0.140 |
| 2.5 | 2.05 | 3.25 | 3.53 | 0.125 | 0.120 | 0.150 |
| 3.0 | 2.18 | 3.68 | 3.75 | 0.150 | 0.210 | 0.165 |
| 3.5 | 2.26 | 3.82 | 3.82 | 0.140 | 0.350 | 0.165 |
| 4.5 | 2.83 | 4.80 | 4.74 | 0.130 | 1.50 | 0.170 |
| 5.0 | 3.11 | 4.94 | 4.94 | 0.155 | 4.40 | 0.650 |
| 5.5 | 3.39 | 5.08 | 5.08 | 0.125 | 4.20 | 1.80 |
| 6.0 | 3.53 | 5.22 | 5.36 | 0.135 | 5.20 | 4.20 |
| 6.5 | 3.68 | 5.78 | 6.08 | 0.260 | 6.80 | 5.90 |
| 7.0 | 3.95 | 6.35 | 6.23 | 1.70 | 10.0 | 10.0 |
| 7.5 | 4.10 | 6.43 | 6.35 | 2.8 | 17.0 | 14.0 |

Table III compares the same three filters for performance in color removal. Five gpm/sq.ft. of water having 100 color units was run through the same three filters, 00467-2, 00467-3 and 20467-1. Forty mg/l of alum and 0.3 mg/l of "Magnifloc" 985-N were added to the filters. Filter 20467-1 performed satisfactorily and better than the other two at the high color dosages. Headloss in the four-media filter was also significantly less throughout.

Filter 00467-3, although six inches deeper than filter 00467-2, had higher headlosses throughout. This is reasonable since the fine fractions tend to accumulate at the top layer of a deeper bed of the same media. At a lower polymer feed, floc penetration would be greater and a deeper filter might be better.

TABLE III

| Time (hr.) | Headloss (feet) | | | Effluent Color | | |
|---|---|---|---|---|---|---|
| | 20467-1 | 00467-2 | 00467-3 | 20467-1 | 00467-2 | 00467-3 |
| 0 | 1.34 | 1.34 | 2.97 | — | — | — |
| 1 | 2.40 | 2.54 | 4.80 | 15 | 15 | 15 |
| 2 | 3.53 | 4.24 | 5.92* | 15 | 15 | 15 |
| 3 | 5.08 | 5.92* | — | 15 | 15 | — |
| 4 | 7.50 | — | — | 15 | — | — |
| 5 | 8.20* | — | — | 15 | — | — |

*Flow started decreasing.

Filters 20460-1 and 20460-2 consisted of the two different specific gravity anthracites and sand, but without garnet. These filters were compared with a four-media filter of the same depth, 20467-1.

Tables IV and V show the comparisons for turbidity and color removal, respectively. In the turbidity removal test 5 gpm/sq.ft. of a Kaolin suspension of 100 mg/1 was used as the filter influent. Eight mg/1 of alum and 0.005 mg/1 of "Magnifloc" 985-N were added to the filters. For the color removal test 5 gpm/sq.ft. of an influent having 100 color units was used. Forty mg/1 of alum and 0.3 mg/1 of "Magnifloc" 985-N were added to the filters. In both tests the four-media filter experienced much longer runs before breakthrough.

rate up to about 10 gpm/sq.ft. Above that rate the slope of the curve bends up gradually, indicating a non-laminar flow condition through the filter bed.

A three-media filter, 00467-2, was compared with three different four-media filters, 20467-3, 20467-4 and 20467-5, to ascertain backwash characteristics for the different bed designs. FIGS. 4a through 4d show that to achieve a given percentage expansion, the backwash rate must increase with the backwash water temperature for all four filter designs. FIGS. 4b through 4d show that the four-media filters require a slightly higher backwash than does the three-media filter shown in FIG. 4a.

FIG. 5 compares the relative backwash requirements

TABLE IV

| Time (hr.) | Headloss (feet) | | | Effluent Turbidity (JTU) | | |
|---|---|---|---|---|---|---|
| | 20460-1 | 20460-2 | 20467-1 | 20460-1 | 20460-2 | 20467-1 |
| 0 | 1.41 | 1.84 | 1.41 | — | — | — |
| 0.5 | 1.70 | 2.83 | 1.70 | 0.35 | 0.29 | 0.19 |
| 1.0 | 2.12 | 2.83 | 2.26 | 0.90 | 0.18 | 0.12 |
| 1.5 | 2.26 | 2.97 | 2.40 | 1.60 | 0.16 | 0.11 |
| 2.0 | 2.54 | 3.11 | 2.54 | 2.70 | 0.36 | 0.14 |
| 2.5 | 2.83 | 3.39 | 2.62 | 3.50 | 0.90 | 0.25 |
| 3.5 | 2.83 | 3.53 | 3.11 | 6.40 | 2.5 | 0.47 |
| 4.0 | 2.90 | 4.10 | 3.25 | 5.20 | 2.5 | 1.0 |
| 4.5 | 3.25 | 4.10 | 4.53 | 10.0 | 4.0 | 2.8 |

TABLE V

| Time (hr.) | Headloss (feet) | | | Effluent Color | | |
|---|---|---|---|---|---|---|
| | 20460-1 | 20460-2 | 20467-1 | 20460-1 | 20460-2 | 20467-1 |
| 0 | 1.70 | 1.70 | 1.13 | — | — | — |
| 0.5 | 2.26 | 2.36 | 1.98 | 10 | 10 | 10 |
| 1.0 | 2.83 | 3.11 | 2.26 | 15 | 10 | 10 |
| 1.5 | 3.95 | 3.95 | 3.11 | 15 | 10 | 10 |
| 2.0 | 5.22 | 4.24 | 4.24 | 15 | 15 | 15 |
| 2.5 | 6.35 | 6.23 | 5.65 | 20 | 10 | 10 |
| 3.0 | 7.50* | 8.62 | 7.06 | 30 | 15 | 15 |

*Flow started decreasing.

A four-media bed, filter 20467-2, was tested in parallel with a three-media bed, filter 00467-1, with the secondary effluents from various plants used as the influent. Table VI shows that the four-media bed experienced lower headlosses for equivalent effluent quality.

for given percentage expansions as a function of the proportion by volume of the two different specific gravity anthracite coals. FIG. 5 shows that the backwash rate increases with an increasing amount of the lower specific gravity anthracite. For example, at 60° F. for

TABLE VI

| Filtration Time (hr.) | Influent | | Effluent Turbidity (JTU) | | Effluent S.S.* (mg/l) | | Initial HL (ft.) | | Final HL (ft.) | |
|---|---|---|---|---|---|---|---|---|---|---|
| | Turbidity | S.S.* | 00467-1 | 20467-2 | 00467-1 | 20467-2 | 00467-1 | 20467-2 | 00467-1 | 20467-2 |
| 2.50 (1) | 7 | 20 | 3.7 | 3.7 | 12 | 10 | 2.34 | 1.20 | 2.90 | 1.56 |
| 4.75 (2) | 53 | 20 | 44 | 45 | — | — | 2.12 | 1.56 | 5.52 | 3.53 |
| 2.0 (3) | 48 | 120 | 31 | 32 | 64 | 72 | 2.40 | 1.20 | 6.23 | 2.26 |
| 4.5 (3) | 40 | 100 | 28 | 28 | 56 | 60 | 2.82 | 1.20 | 5.58 | 2.54 |
| 2.75 (3) | 35 | 124 | 15 | 15 | 42 | 40 | 2.26 | 1.34 | 2.75 | 3.82 |
| 4.75 (3) | 33 | 76 | 18 | 18 | 28 | 28 | 2.40 | 1.48 | 3.39 | 2.12 |
| 4.50 (3) | 51 | 128 | 36 | 36 | 68 | 64 | 2.40 | 1.27 | 3.47 | 1.84 |
| 5.0 (3) | 35 | 70 | 17 | 17 | 20 | 20 | 2.40 | 1.20 | 4.60 | 3.11 |
| 3.75 (3) | 28 | 42 | 15 | 16 | 10 | 12 | 2.34 | 1.34 | 3.11 | 1.77 |

Figure 2:
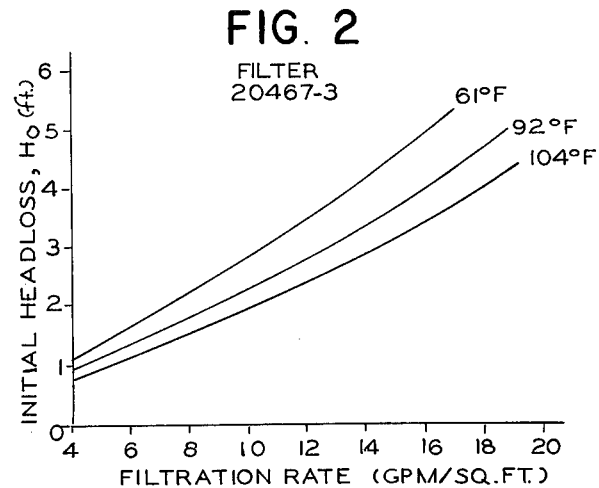
FIG. 2 is a graph of initial headloss as a function of filtration rate for a four-media filter bed at various influent temperatures.
Figure 3:
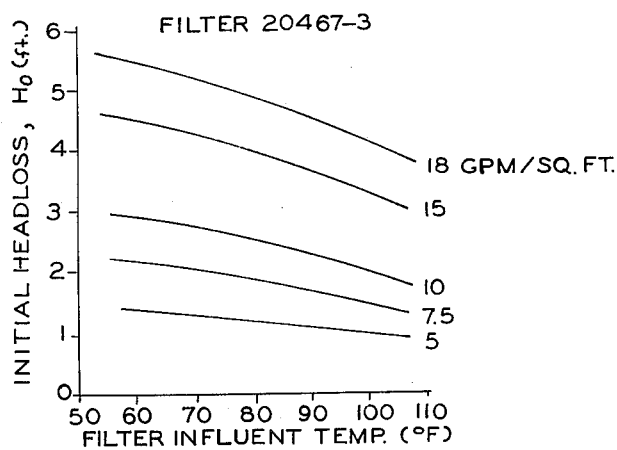
FIG. 3 is a graph of initial headloss as a function of influent temperature for various filtration rates through a four-media filter.

*Suspended Solids
(1) Plant at Stayton, Oregon
(2) Plant at Albany, Oregon
(3) Plant at Philomath, Oregon Filter 20467-3 was tested at various temperatures and filtration rates to measure initial headloss. The results are shown in FIGS. 2 and 3. FIG. 2 shows that headloss increases linearly with increasing filtration a 20 percent expansion of a 30-inch four-media filter bed having lower specific gravity anthracite and higher specific gravity anthracite in a 1:1 ratio by volume, the required backwash rate is 1.26 (26 percent higher)

than for a three-media filter (00467-2) having the same total depth of coal but of constant (and higher) specific gravity.

The coal layer expands only slightly during backwash while the sand and garnet layers are fully fluidized. It has been found necessary to expand the total bed by at least 15 percent and preferably 20 percent to achieve adequate cleaning and reclassification of particles.

Additional comparison tests were run between a four-media filter and one designed according to the disclosure in the Harris publication. The beds were constructed as shown in Table VII.

TABLE VII

| Media | No. 1 Four-Media | | | No. 2 (Harris) | | |
|---|---|---|---|---|---|---|
| | Depth (inches) | Effective Size (mm) | Sp. Gr. | Depth (inches) | Effective Size (mm) | Sp. Gr. |
| Coal | 10 | 1.60 | 1.42 | 14 | 1.60 | 1.42 |
| Coal | 8 | 1.05 | 1.62 | 7 | 0.90 | 1.62 |
| Sand | 9 | 0.60 | 2.60 | 9 | 0.30 | 2.60 |
| Garnet | 3 | 0.30 | 4.01 | 0 | — | — |

Tests were run with a Kaolin suspension of 120 JTU, with 8 ppm of alum and 0.03 ppm of secondary flocculent being added. Flow rate was at 5 gpm/sq.ft. The results are shown in Tables VIII and IX and indicate that the four-media filter produces an equal effluent but at significant lower headloss increase.

A further observation was that after backwashing, a significant amount of sand was mixed with the coal at the top of filter No. 2 instead of staying at the bottom layer. This resulted in a headloss increase and consequently, a short filter run because of the misplaced fine medium.

TABLE VIII

| Time (hr.) | Headloss (feet) | | Turbidity (JTU) | |
|---|---|---|---|---|
| | Filter No. 1 | Filter No. 2 | Filter No. 1 | Filter No. 2 |
| 0 | 1.98 | 3.68 | — | — |
| 0.25 | 2.26 | 3.95 | 1.40 | 0.63 |
| 0.50 | 2.12 | 4.10 | 0.40 | 0.18 |
| 0.75 | 2.26 | 4.24 | 0.20 | 0.24 |
| 1.00 | 2.54 | 4.53 | 0.15 | 0.12 |
| 1.25 | 2.54 | 4.80 | 0.25 | 0.12 |
| 1.50 | 2.54 | 5.08 | 0.11 | 0.10 |
| 2.00 | 2.83 | 5.65 | 0.15 | 0.10 |
| 2.50 | 2.97 | 6.65 | 0.18 | 0.10 |
| 3.00 | 3.39 | 7.35 | 0.30 | 0.42 |
| 3.50 | 3.82 | 9.05 | 0.19 | 0.11 |

TABLE IX

| Time (hr.) | Headloss (feet) | | Turbidity (JTU) | |
|---|---|---|---|---|
| | Filter No. 1 | Filter No. 2 | Filter No. 1 | Filter No. 2 |
| 0 | 1.98 | 3.25 | — | — |
| 0.25 | 2.12 | 4.10 | 0.25 | 0.18 |
| 0.50 | 2.26 | 4.24 | 0.55 | 0.12 |
| 1.00 | 2.26 | 4.80 | 0.22 | 0.11 |
| 1.50 | 2.54 | 5.08 | 0.09 | 0.10 |
| 2.00 | 2.54 | 5.65 | 0.10 | 0.13 |
| 2.50 | 2.83 | 6.35 | 0.11 | 0.14 |
| 3.00 | 3.11 | 7.06 | 0.17 | 0.18 |
| 3.50 | 3.11 | 7.50 | 0.38 | 0.44 |
| 4.25 | 3.82 | 8.75 | 2.50 | 1.60 |
| 5.00 | 4.24 | 9.32 | 2.70 | 1.40 |

We claim:

1. In a filter for the filtration of water and having backwash means and a bed comprising particles of filter media of different specific gravities, the particles of each specific gravity being within a discrete size range, the size range of said particles being inverse to their specific gravities, whereupon said filter when backwashed achieves an orientation having a continually increasing number of particles per unit area in the direction of water flow through said bed, the improvement comprising:
a first filter medium comprising coal having a specific gravity in the range between about 1.30 and 1.50;
a second filter medium comprising coal having a specific gravity in the range between about 1.60 and 1.80;
a third filter medium comprising silica sand having a specific gravity in the range between about 2.60 and 2.65; and
a fourth filter medium comprising particles selected from the group consisting of garnet particles and ilmenite particles.

2. The filter of claim 1 in which said first filter medium comprises cannel coal having a specific gravity in the range between about 1.30 and 1.40, and an effective size of between about 1.8 and 2.2 mm.

3. A filter as in claim 1 in which the relative volumes of said first and second filter media are in the range from 0.1 to 10.0.

* * * * *